United States Patent
Engel

(10) Patent No.: US 7,821,355 B2
(45) Date of Patent: Oct. 26, 2010

(54) WAVEGUIDE ANTENNA FRONT END

(75) Inventor: Benjamin M. Engel, Haifa (IL)

(73) Assignee: Starling Advanced Communications Ltd., Yoqneam (IL)

( * ) Notice: Subject to any disclaimer, the term of this patent is extended or adjusted under 35 U.S.C. 154(b) by 183 days.

(21) Appl. No.: 12/258,470

(22) Filed: Oct. 27, 2008

(65) Prior Publication Data

US 2010/0102899 A1    Apr. 29, 2010

(51) Int. Cl.
H01P 5/12         (2006.01)
H01P 1/207        (2006.01)

(52) U.S. Cl. .................. 333/117; 333/208; 333/248

(58) Field of Classification Search .................. 333/117, 333/122, 135, 208, 209, 248
See application file for complete search history.

(56) References Cited

U.S. PATENT DOCUMENTS

| | | | | |
|---|---|---|---|---|
| 5,907,309 | A * | 5/1999 | Anderson et al. | 343/786 |
| 6,597,260 | B2 | 7/2003 | Sasaki et al. | |
| 6,828,875 | B2 | 12/2004 | Channabasappa et al. | |
| 7,474,173 | B2 * | 1/2009 | Avramis et al. | 333/126 |
| 7,630,696 | B2 * | 12/2009 | Loyet | 455/137 |
| 2007/0139135 | A1 | 6/2007 | Ammar et al. | |

FOREIGN PATENT DOCUMENTS

| | | |
|---|---|---|
| EP | 1341253 | 9/2003 |
| EP | 1469548 | 10/2004 |

OTHER PUBLICATIONS

International Search Report Dated Jun. 3, 2009 From the International Searching Authority Re.: Application No. PCT/IL2008/001414.
Written Opinion Dated Jun. 3, 2009 From the International Searching Authority Re.: Application No. PCT/IL2008/001414.
Davis et al. "Design of an X/Ka Maritime Terminal", First European Conference on Antennas and Propagation, EUCAP 2006, IEEE, XP031393619, P.1-6, Nov. 6, 2006. Abstract, § [05.5].
Tomassoni et al. "A Precedure for Computer-Aided Design of Compact Diplexer With Folded Filters", 34th European Microwave Conference, Amsterdam, NL, Oct. 13, 2004, XP010788320, 3: 1233-1236, Oct. 11, 2004. Abstract, Fig. 1.

* cited by examiner

Primary Examiner—Dean O Takaoka
(74) Attorney, Agent, or Firm—Pearl Cohen Zedek Latzer, LLP

(57) ABSTRACT

In some embodiments of the present invention, an antenna front end includes at least two diplexers. Each of the diplexers is defined with a channel within a single material block. Each channel is shaped to provide a diplexer which includes a coupler, a receive band filter and a transmit band filter, which are adjoined and matched to form a continuous waveguide channel. Some embodiments further include a transmit hybrid coupler and/or a receive hybrid coupler. The transmit hybrid coupler is formed as a channel within the material block and adjoined and matched to the two transmit band filters. The receive hybrid coupler is formed as a channel within the material block and adjoined and matched to the two receive band filters.

17 Claims, 10 Drawing Sheets

WAVEGUIDE ANTENNA FRONT END

FIELD AND BACKGROUND OF THE INVENTION

The present invention, in some embodiments thereof, relates to a radio frequency (RF) antenna front end front end, and, more particularly, but not exclusively, to an RF waveguide module which incorporates multiple RF components.

Some RF signal processing is performed using waveguide (WG) components. These waveguide components are often provided with protruding flanges which serve for connecting the separate components together. These flanges may protrude several centimeters from the rest of the component, increasing the size of a system formed by connecting multiple components together by their flanges. Waveguide components connected by flanges typically require integration after the components are connected together.

Additionally, some microwave components, such as waveguide filters, include tuning screws. These tuning screws are used to adjust the electrical properties of the waveguide modules within a filter (e.g. by changing the electrical admittance of a post or iris) in order to obtain the required performance, and to compensate for production tolerances. A system formed from components with tuning screws generally requires tuning to electrically match the system components after they are connected together, in addition to tuning the separate system components, which may be a time-consuming and tedious process.

In US Pat. Appl. Publ. by 2007/0139135 Ammar et al. a diplexer includes a diplexer housing having transmit and receive waveguide channels formed within. A septum insert is placed between the diplexer housing and cover.

Additional background art includes European Pat. Appl. 1469548A1, U.S. Pat. No. 6,828,875 and U.S. Pat. No. 6,597,260.

SUMMARY OF THE INVENTION

Embodiments of the present invention relate to an antenna front end, which is formed as a continuous channel within a material block. Current manufacturing techniques enable the formation of such a front end which meets the required specifications for satellite communications.

In some embodiments, the front end includes two diplexers which are formed within a single block of material. Each diplexer is formed as continuous channel within the material block. In an exemplary configuration, the diplexer includes adjoined and matching a T-Junction (i.e. splitter), receive band filter and transmit band filter. In some further embodiments, the two diplexers are adjoined and matched in an antenna front end configuration, as described in detail below. The channel within the material block may be covered by a lid which completes the waveguide structure of the front end.

By forming the front end in this manner, no connecting flanges between the components are required, leading to a less bulky device with a smaller profile. An additional advantage in some embodiments, is that the components may be connected without a join or break in the material. This may reduce reflection and impedance mismatch between the components.

Other embodiments of the present invention relate to an integrated RF waveguide module (denoted herein an RF module) which forms adjoining waveguide components as a channel or channels in a single block of material.

In an exemplary embodiment of the invention, the RF module is formed as a single block of material, with an interior channel or channels shaped into RF components which perform processing of a waveguide signal. In some embodiments, the channels are adjoined and matched to form a continuous waveguide channel. The RF signal may thus be processed by multiple waveguide components within a single material block. In some embodiments, the channel is machined out of a block of aluminum.

In some embodiments, the accuracy obtainable with current manufacturing processes enables the manufacture of a waveguide device in which incorporates RF components without tuning screws. The benefit of avoiding tuning screws is the elimination of component tuning from the manufacturing process, and that no additional integration is required between the various components incorporated into the waveguide device.

According to an aspect of some embodiments of the present invention there is provided an antenna front end, defining with channels within a material block: a first diplexer which includes a first coupler, a first transmit band filter and a first receive band filter, adjoined and matched to form a first continuous waveguide channel; and a second diplexer which includes a second coupler, a second transmit band filter and a second receive band filter, adjoined and matched to form a second continuous waveguide channel.

According to some embodiments of the invention, each of the diplexers further includes a respective RF port formed in the material block, and configured as an RF port to a respective T-Junction.

According to some embodiments of the invention, each of the T-Junction is configured to convey an RF signal from a respective transmit band filter for output by a respective RF port, and to convey an RF signal input from a respective RF port to a respective receive band filter.

According to some embodiments of the invention, the antenna front end further includes a receive hybrid coupler defined with a channel within the material block, and adjoined and matched to the first and second receive band filters.

According to some embodiments of the invention, the antenna front end further includes a transmit hybrid coupler defined with a channel within the material block, and adjoined and matched to the first and second transmit band filters.

According to some embodiments of the invention, at least one of the filters is non-tunable.

According to some embodiments of the invention, both of the diplexers are for passive processing of an RF signal.

According to some embodiments of the invention, the antenna front end further includes a lid adapted to adjoin to the material block so as to form a waveguide cavity.

According to some embodiments of the invention, the antenna front end further includes at least one waveguide to coax adapter.

According to some embodiments of the invention, the front end is configured for operation over at least 20% of a frequency band of 10.7 GHz to 14.5 GHz.

According to some embodiments of the invention, the front end is configured for reception over at least a portion of a frequency band of 10.7 GHz to 12.75 GHZ, and is configured for transmission over at least a portion of a frequency band of 14.0 GHz to 14.5 GHZ.

According to some embodiments of the invention, at least one of the filters includes a channel with two bends, so as to reduce a required dimension of the material block.

According to some embodiments of the invention, the waveguide channels are coated with an electrically conductive material.

According to some embodiments of the invention, at least a portion of the waveguide channels is filled with a dielectric material.

According to some embodiments of the invention, all of the waveguide channels are filled with a dielectric material.

According to some embodiments of the invention, the antenna front end is formed of pressure-molded dielectric material coated with an electrically conductive material.

According to some embodiments of the invention, the antenna front end is formed of machined dielectric material coated with an electrically conductive material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
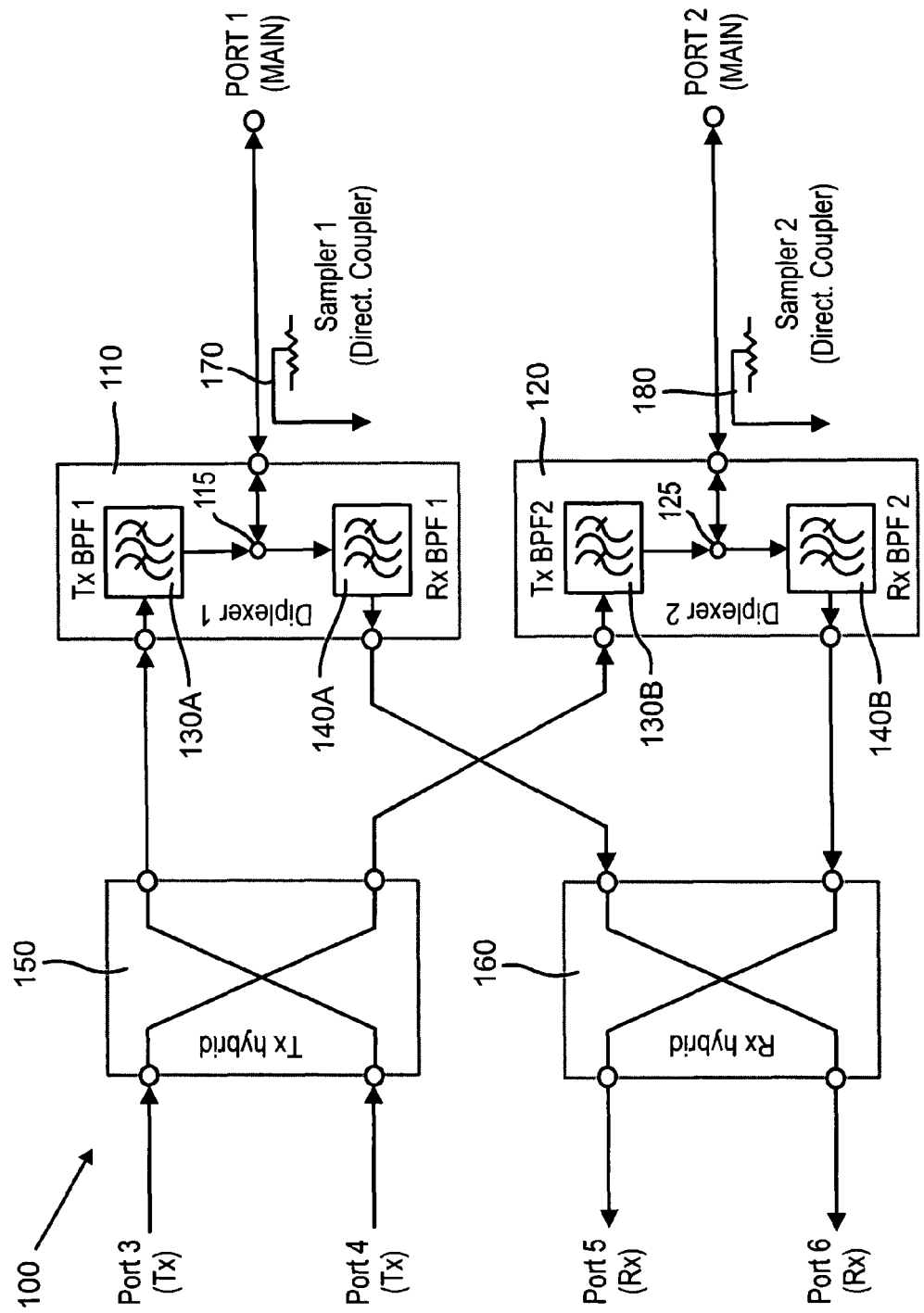
FIG. 1 is a simplified block diagram of an antenna front end, according to an embodiment of the present invention.

The present invention, in some embodiments thereof, relates to an antenna front end, and, more particularly, but not exclusively, to an RF waveguide module which incorporates multiple RF components.

The present embodiments present an antenna front end which includes multiple waveguide components within a single block of material. By providing multiple components within a single block, a smaller-dimensioned front end is, without flanges connecting between the components located within the block. Additionally, in some embodiments no connectors are required to transfer the RF signal between adjoining components within the block, possibly leading to improved signal performance. The accuracy available in current manufacturing techniques may also eliminate the need for tuning screws in order to obtain the desired performance, and to save tuning time and measurement equipment cost. With no tuning required, reliability may be increased and maintenance costs reduced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some of the figures described herein show views of RF components, including for example filters and couplers. These figures are for illustrative purposes, and are not shown to scale or to indicate the actual dimensions of the components unless explicitly so stated. Figures illustrating multiple components together or showing multiple views of same component are not necessarily indicative of the relative dimensions between the components and/or the different views. The RF components may be shown in part, and may not show all portions thereof, such as waveguide adaptors.

In the following, the term "component" (or a specifically named component) denotes all or a substantial part of the component (or the named component), depending on the embodiment described. The term substantial part means that the RF component part serves for RF processing of the signal.

For example, a filter within the RF module may not include the connectors for signal input/output. Types of waveguide components include filters, couplers, splitters, and other waveguide components capable of modifying and/or routing an RF signal.

For purposes of better understanding some embodiments of the present invention, as illustrated in FIG. 1 of the drawings, reference is first made to the construction and operation of antenna front end.

Reference is now made to FIG. 1, which is a simplified block diagram of an embodiment of an antenna front end. Front end 100 may be used for polarized transmission and reception, with frequency domain multiplexing, amongst other possible transmission/reception modes.

Front end 100 includes two diplexers, 110 and 120 and two hybrid couplers 150 and 160. In some embodiments of the invention, hybrid couplers 150 and 160 provide 3-dB quadrature (0°/90°) coupling. Front end 100 optionally includes one or both of directional couplers 170 and 180, which serve as samplers (i.e. directional coupler) of the RF signals from the antenna. Ports 1 and 2 each connect to a separate antenna. Transmit (Tx) ports 3 and 4 input signals intended for transmission by the antennas. Receive (Rx) ports 5 and 6 output signals received from the antennas through ports 1 and 2, after processing by front end 100.

Each diplexer includes a 3-dB quadrature (0°/90°) coupler and two bandpass filters. For example, diplexer 110 includes T-Junction 115, transmit BPF 130A and receive bandpass filter 140A. Bandpass filters 130A and 140A separate the transmission and reception frequency ranges, so that the same antennas may be used simultaneously for transmission and reception.

Transmit (Tx) hybrid coupler 150 provides 0° and 90° coupling of the RF signals input from Tx port 3 and Tx port 4. The signals are input into transmit bandpass filters 130A and 130B and then output from Ports 1 and 2 respectively. Similarly, receive (Rx) hybrid coupler 160 provides 0° and 90° coupling of the RF signals received from the antennas at Ports 1 and 2, after they have been filtered by Rx bandpass filters 140A and 140B respectively.

In some embodiments of the invention, two waveguide diplexers are defined in a single block of material. Each of the diplexers is formed as an interior channel within the block. Each diplexer channel includes a waveguide T-Junction portion, a waveguide receive band filter portion and a waveguide transmit band filter portion. The portions are adjoined and matched to form a continuous waveguide channel. In some embodiments, the two diplexers are coupled together to provide an antenna front end formed as a single continuous channel within the material block.

Some embodiments of the present invention provide a waveguide antenna front end which is configured similarly to front end 100. Such embodiments may be suitable for use in conjunction with two orthogonally-polarized antennas, namely one horizontally polarized antenna and one vertically polarized antenna, in order to perform electronically-controlled polarization alignment of a mobile SATCOM antenna. Another key function achievable in some embodiments of the front end is to separate between a high power transmitted signal and a low power received signal, thus utilizing the same antenna(s) simultaneously for transmission and reception.

Figure 2:
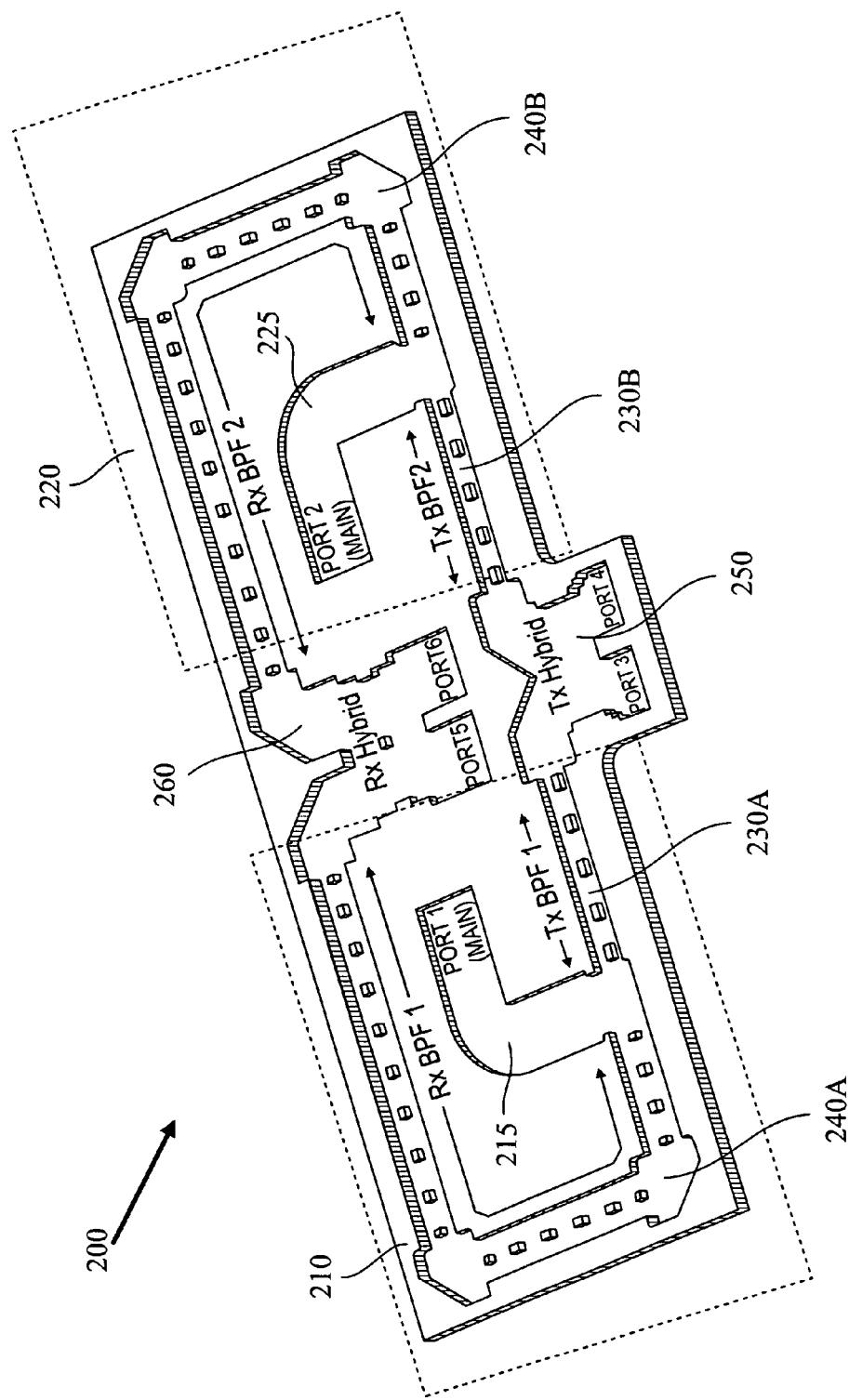
FIG. 2 is a simplified three-dimensional view of an antenna front end, according to an embodiment of the present invention.

Reference is now made to FIG. 2, which is a simplified three-dimensional view of an antenna front end assembly, according to an embodiment of the present invention. Front end 200 is an RF module which defines two diplexers, 210 and 220, with channels within a material block. Diplexers 210 and 220 perform passive processing of RF signals.

Forming front end 200 as a continuous waveguide channel within a material block enables achieving a high level of integration, and consequently to reduced front end dimensions. Furthermore, the monolithic design may simplify the manufacturing process, reduce weight, and/or reduce manufacturing costs as compared to separate flanged waveguide components.

Front end 200 may be manufactured using CNC machining of an aluminum block. The single-block construction eliminates the need for bulky waveguide flanges, and contributes to the compactness of the front end. CNC machining is currently obtainable with a tolerance of +/−0.01 mm. This tolerance eliminates the need for tuning screws in the front end, which also contributes to the compactness of the front end, and may reduce the system integration costs.

In some embodiments, front end 200 is designed for operation over the entire frequency band of 10.7 GHz to 14.5 GHz. The frequency band is divided into receive and transmit channels by the four bandpass filters. In other embodiments front end 200 is designed for operation over at least 20% of the frequency band of 10.7 GHz to 14.5 GHz. For example, the receive bandwidth may be 10.7-12.75 GHz (e.g. 11.7-12.2 GHz), and the transmit bandwidth may be 14-14.5 GHz. In another example, the receive bandwidth is a portion of the 10.7-12.75 GHz band, and the transmit bandwidth is a portion of the 14-14.5 GHz band (e.g. 14.1-14.4 GHz).

Each of diplexers 210 and 220 includes a coupler, transmit band filter and receive band filter, which are adjoined and matched to form a continuous waveguide channel. For example, diplexer 210 includes T-Junction 215, transmit band filter 230A and receive band filter 240A. In some embodiments, some or all of filters 230A, 230B, 240A and 240B are non-tunable.

Further embodiments of front end 200 include receive (Rx) quadrature hybrid coupler 260 and/or transmit (Tx) quadrature hybrid coupler 250, for coupling diplexers 210 and 220 as shown in FIG. 2. Preferably, Rx quadrature hybrid coupler 260 is defined with channels within the material block, and is adjoined and matched to receive band filters 240A and 240B. Preferably, Tx quadrature hybrid coupler 250 is defined with channels within the material block, and is adjoined and matched to transmit band filters 230A and 230B.

In some embodiments, at least one of the filters includes a channel with two bends, so as to reduce a required dimension of the material block. In the embodiment of FIG. 2, each of Rx bandpass filters 240A and 240B is formed with two bends, which enables a more compact design. In one embodiment, a Ku-band bandpass filter, with a bandwidth of 10.7 GHz to 12.75 GHZ, is formed as a channel within a portion of the material block of about 14 cm (L)×12 cm (W)×1 cm (H). Typically, the length of a similar filter, with the same bandwidth but formed without a bend, is approximately 20 cm.

In some embodiments, front end 200 further includes two pairs of waveguide ports (i.e. waveguide interfaces), PORT 1-PORT 4, and one pair of waveguide to coax adapters for providing coaxial ports, PORT 5-PORT 6. PORT 1 and PORT 2 serve as a main RF ports into T-Junctions 215 and 225 respectively. Front end 200 may connect to the antennas at PORT 1 and PORT 2 by pressure, or may be attached by screws.

PORT 3 and PORT 4 are the RF ports of Tx Hybrid coupler 250. PORT 5 and PORT 6 are the RF ports of Rx Hybrid coupler 260.

Front end 200 may further include at least one sampler (not shown), configured similarly to samplers 170 and 180 of FIG. 1. When present, each sampler provides an additional pair of RF waveguide ports.

Preferably, front end 200 includes a lid adapted to adjoin to the material block so as to form a waveguide cavity.

Figure 3:
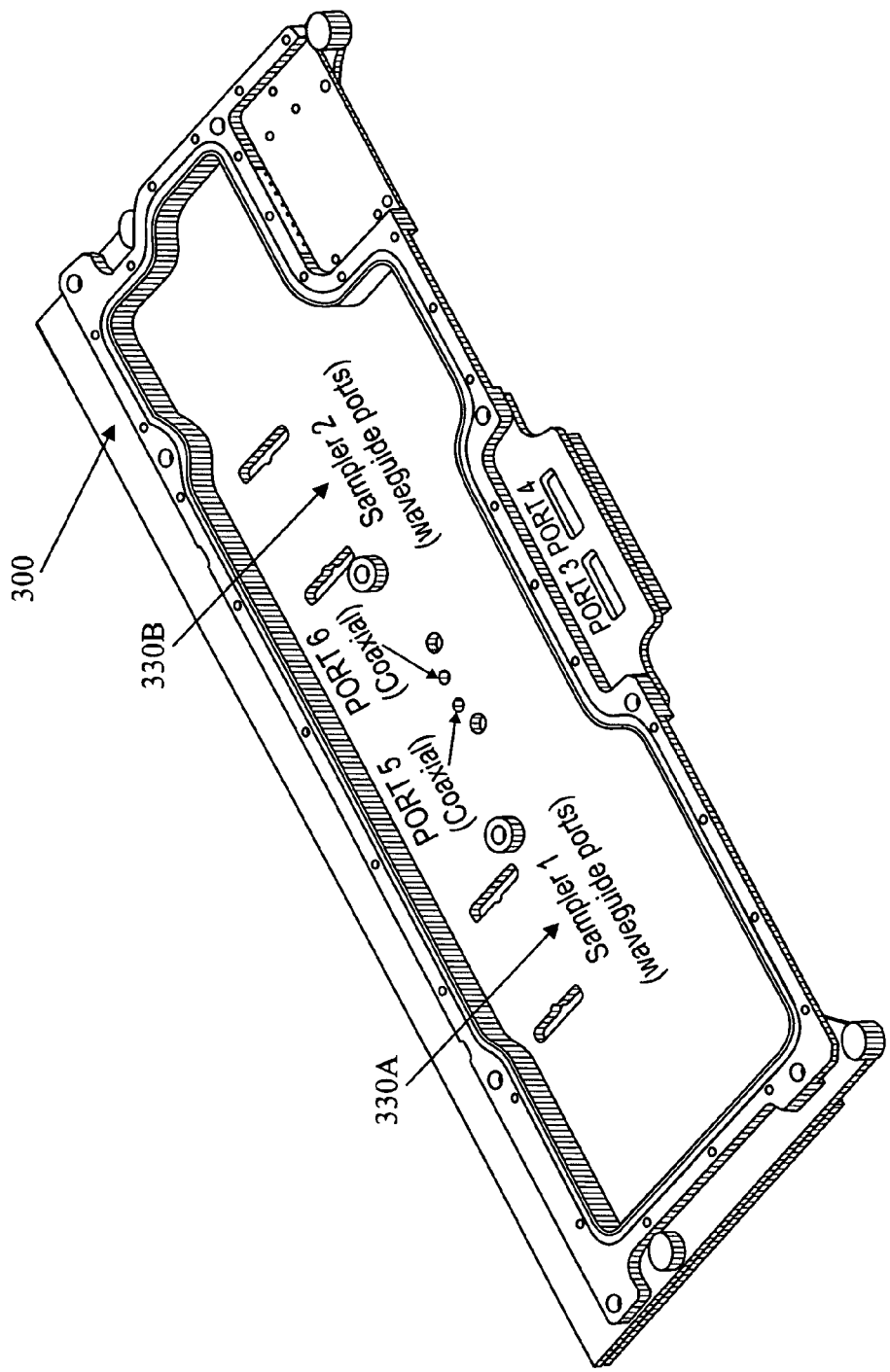
FIG. 3 is a simplified three-dimensional view of a top lid, according to an embodiment of the present invention.
Figure 4:
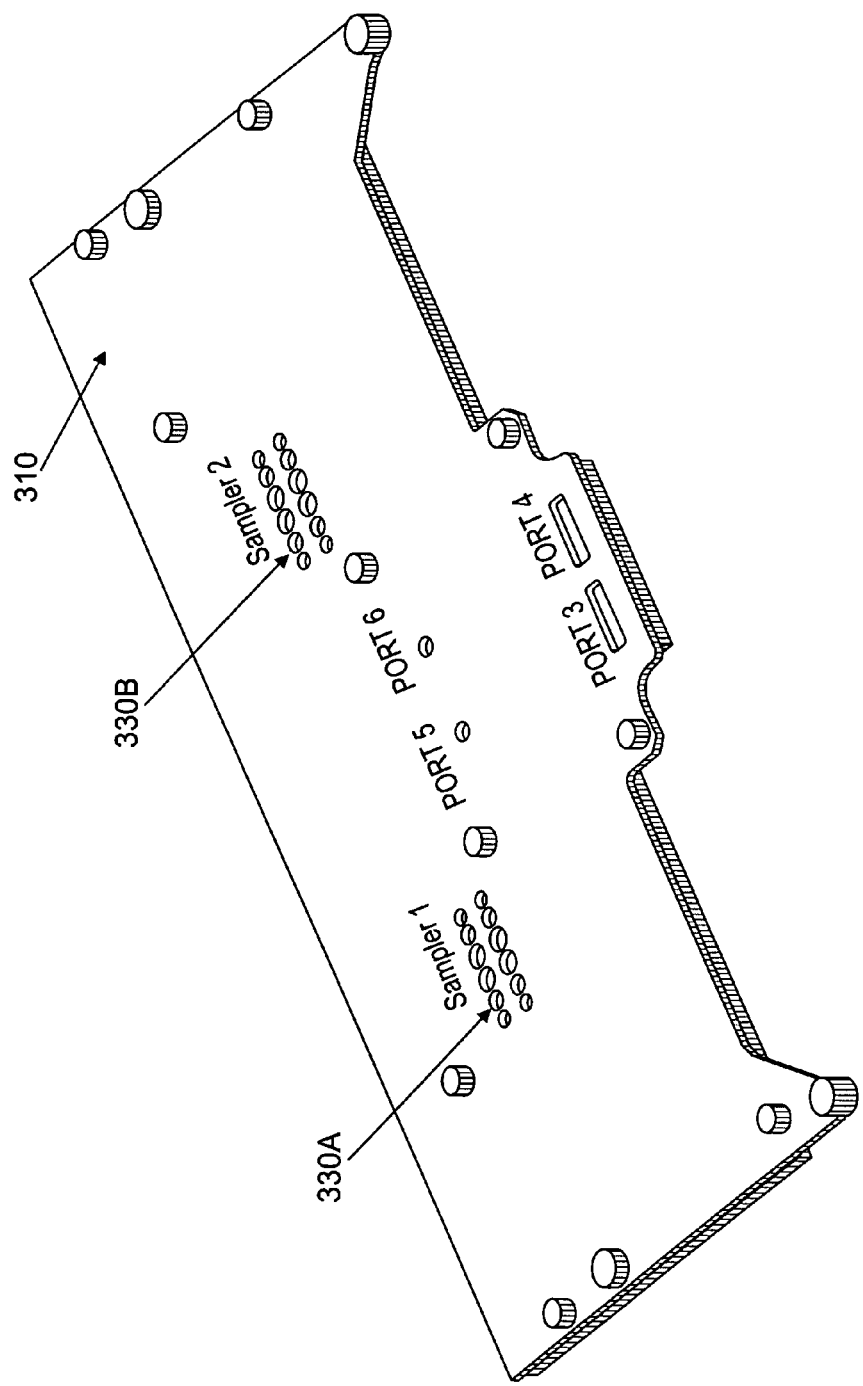
FIG. 4 is a simplified three-dimensional view of a bottom lid, according to an embodiment of the present invention.

Reference is now made to FIGS. 3 and 4, which are simplified three-dimensional views of an exemplary top and bottom lid respectively, according to an embodiment of the present invention. The lids are attached to front end 200 to form a closed waveguide channel within the block. Lid 300 of FIG. 3 attaches directly to the block, and lid 310 of FIG. 4 attaches over lid 300. Two waveguide samplers, 330A and 330B, are formed within the lids. In an exemplary embodiment of the present invention, a Ku-band sampler is integrated into a 3 cm×2 cm×1.5 cm portion of the material block. A typical waveguide sampler when purchased as a flanged waveguide component can be up to 30 cm×8 cm×4 cm (length×width×height).

In some embodiments of the present invention, a radio frequency (RF) waveguide module (denoted herein an RF module) includes at least parts of multiple waveguide components within a single material block. Each of the components is created as a waveguide channel within the block, with the channel shaped to create a component with the required performance. As shown in embodiments below, the channels for different components are adjoined in order to perform joint processing of the RF signal in series and/or in parallel. The resulting monolithic RF module may thus perform relatively complex RF signal processing, which otherwise requires multiple separate RF components connected together.

In some embodiments, the RF module includes at least part of a waveguide filter and at least part of a waveguide coupler. Examples of RF modules with at least one filter and a coupler are shown in FIGS. 4-7B. Types of filters may include bandpass, high-pass and low-pass filters. Types of couplers may include a directional coupler, sampler, splitter, and hybrid coupler. Additionally, one or more RF ports and/or waveguide transformers may be formed in the material block.

Embodiments of the RF module may include one or more of: WG Hybrid Junction, WG Taper (slopped or stepped), Ortho Mode Transducer (OMT), WG Stepped Transformers (H-Plane or E-Plane type), WG Loads (i.e. Terminations), Finned WG (e.g. WG with fins), Single-Ridged WG, Double Ridged WG, WG Short, WG Switch, WG Phase Shifter, WG Polarizer, WG Dual Directional Coupler, Cross-Guide Coupler, Mode-Converters, WG Attenuator and WG Radiator (e.g. antenna cells).

In some embodiments, only passive and non-tunable components are included within the block, possibly forming a highly-reliable single RF module, which requires no maintenance. Other embodiments include tunable components. Tuning elements (e.g. screws) may be placed, for example, at a junction between components and/or on a waveguide post. However, by adjoining the components together rather than by connectors fewer tuning elements are possibly required.

In some embodiments the RF module includes a lid, or multiple layers of lids, which attach to the material block in order to form a waveguide cavity. Further embodiments incorporate a directional coupler as holes within the lid. Some embodiments include forming channels in the lid. The channels in the lid may be formed to align, all or in part, with the channels in the material block.

After being formed within the block, the channels defining the components may be coated, all or in part, with a conductive material such as silver, copper or gold. The conductive coating may reduce the electrical loss of the component, and is selected to obtain the desired electrical conductivity, reducing or totally eliminating susceptibility to oxidization and manufacturing cost. Optionally, the channels may be filled, all or in part, with a dielectric material in order to reduce the required size of the RF module.

In some embodiments the front end is formed of pressure-molded dielectric material coated with an electrically conductive material. In other embodiments the front end is formed of machined dielectric material coated with an electrically conductive material.

Possible materials for the material block include aluminum and plastic. Manufacturing techniques include machining, particularly computer numerically controlled (CNC) machining, Electrical Discharge Machining (EDM) 2) Stereolithography (3-D Layering) and pressure molding. The manufacturing technique is selected to obtain the desired accuracy, surface finish and manufacturing cost.

In some embodiments, a channel forming a component includes a bend (e.g. the Rx bandpass filters of FIG. 2).

In some embodiments, channels are formed on opposite sides of the block, and connected by via-holes (a.k.a. vias).

One or more waveguide to coax adapters may be formed in or externally connected to the RF module, possibly on the lid.

Referring now to the drawings, FIGS. 5A-6B show exemplary configurations of RF modules, each of which includes a filter and coupler.

In embodiments such as those shown in FIGS. 5A-7B, the filter(s) and the coupler are adjoined and matched to form a continuous waveguide channel. The RF signal may thus be filtered and coupled by the RF module without being output from one component and re-input into the second component.

Figure 5A:
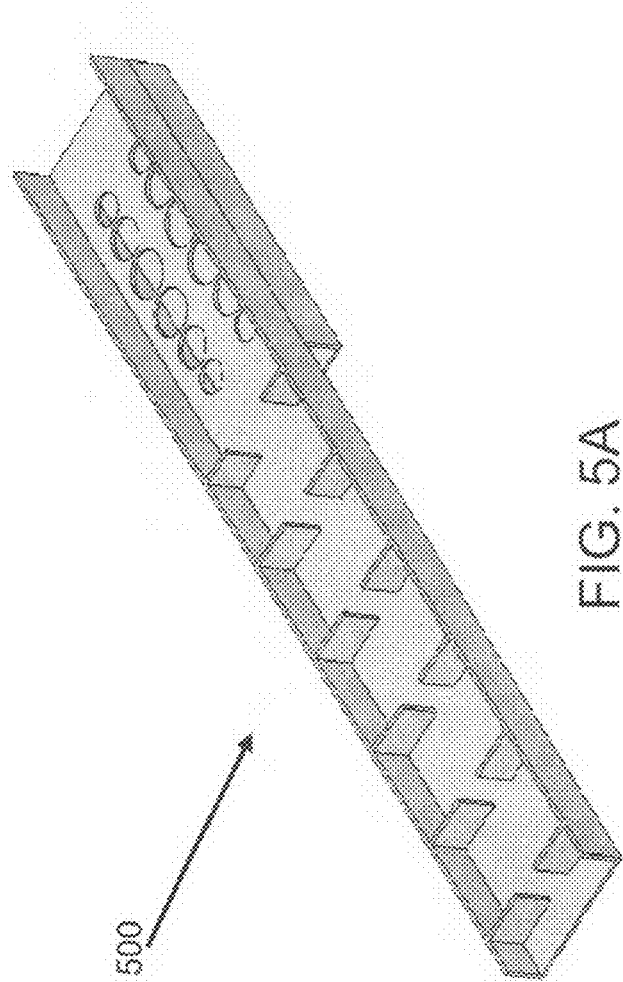
FIGS. 5A and 5B are simplified three-dimensional and top views respectively of an RF module, according to a second exemplary embodiment of the present invention.
Figure 5B:
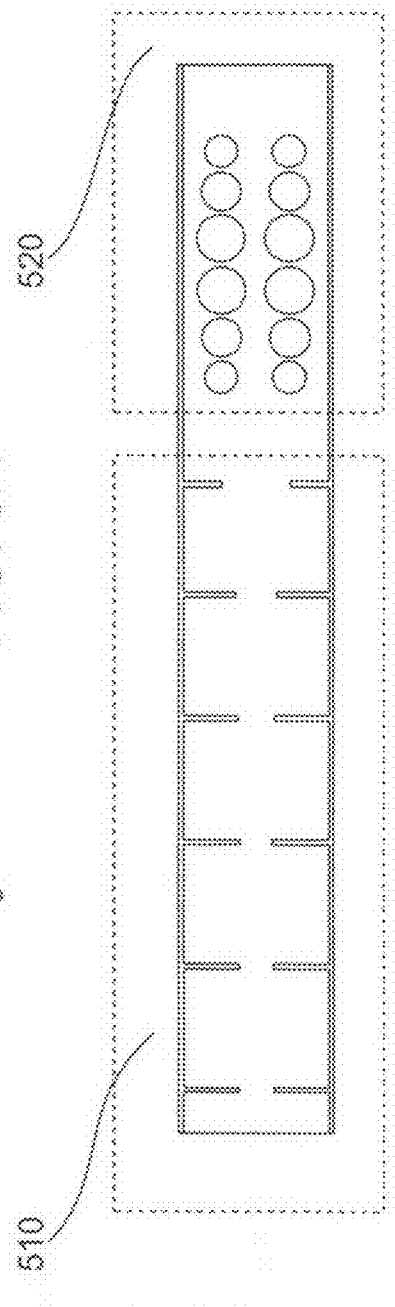

In some embodiments, a filter and coupler are arranged in series, for serial processing of a waveguide signal. FIGS. 5A and 5B are simplified three-dimensional and top views respectively of an RF module, according to an exemplary embodiment of the present invention. In RF module 500, filter 510 and coupler 520 are arranged in series, so that the filtering and coupling functions may be performed in series without requiring the output and re-input of the RF signal.

Figure 6A:
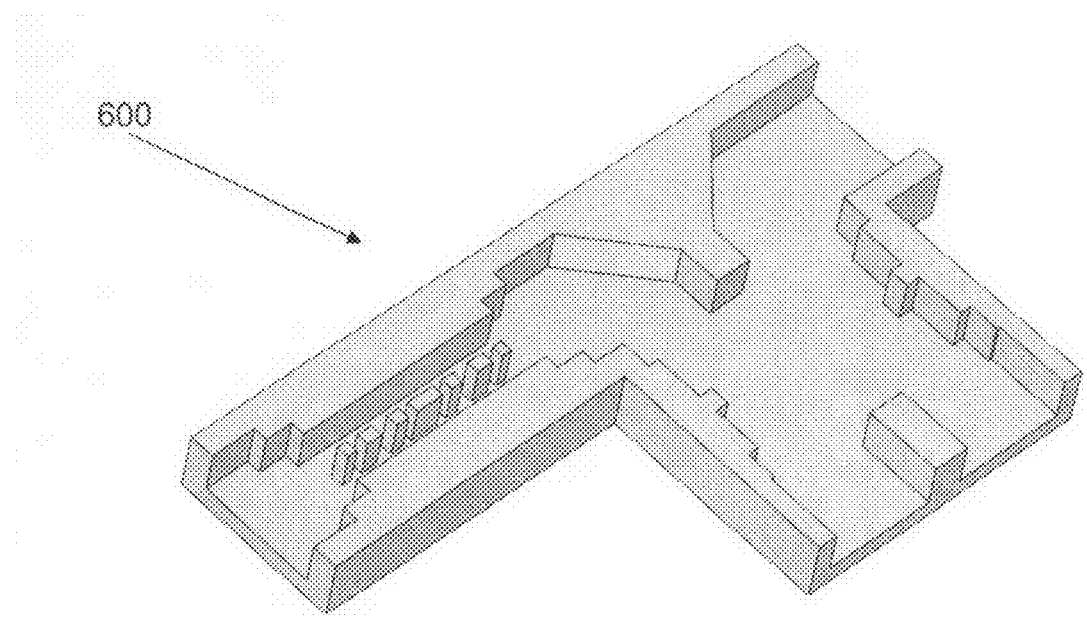
FIGS. 6A and 6B are simplified three-dimensional and top views respectively of an RF module, according to a third exemplary embodiment of the present invention.
Figure 6B:
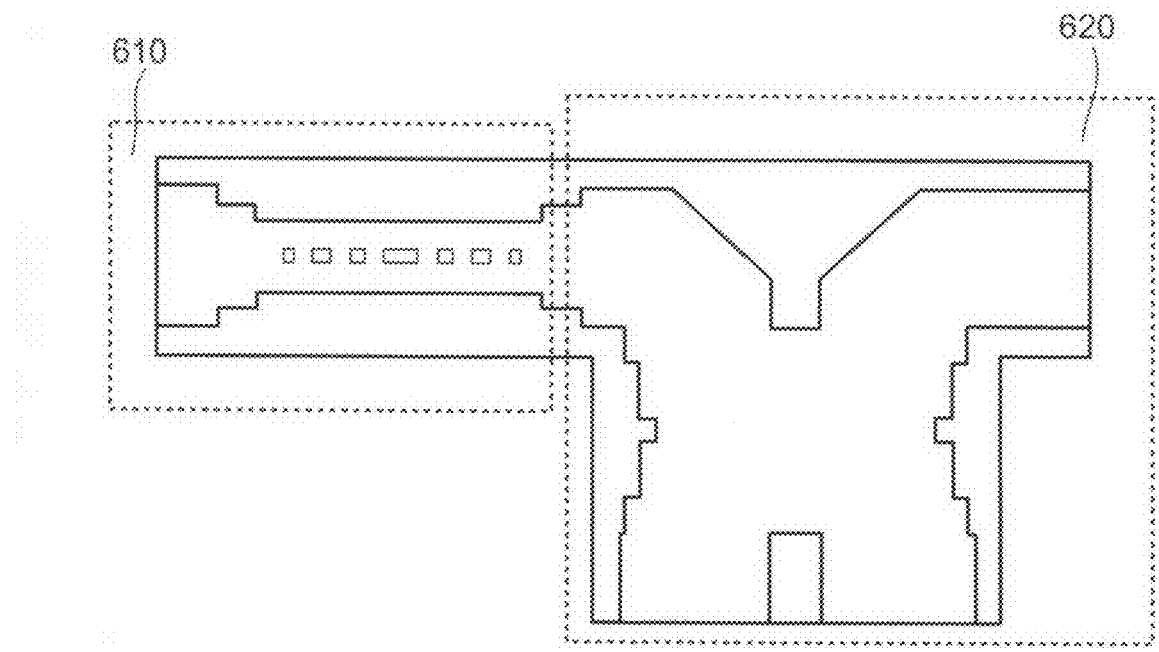

FIGS. 6A and 6B are simplified three-dimensional and top views respectively of an RF module, according to a further exemplary embodiment of the present invention. In the present embodiment, RF module 600 includes bandpass filter 610 and hybrid coupler 620, adjoined in series for serial processing of the RF signal.

In the present exemplary embodiment, bandpass filter 610 is a Ridged Waveguide Evanescent Mode Filter. Ridged waveguide evanescent mode filters typically have attractive features such as wide stopbands and compact size. Hybrid coupler 620 is a Riblet short-slot coupler, and belongs to the family of 'H-plane slot 3 dB-couplers'. Such couplers provide close to equal power splitting, and are known for their high isolation, high return loss, and accurate 90 degree phasing over 15% bandwidth. By using several sections in tandem, the Riblet short-slot coupler features a usable bandwidth that can be stretched over a 20% bandwidth with accurate 90 degree phasing.

In some embodiments components of the RF module are arranged for parallel operation on a waveguide signal.

Figure 7A:
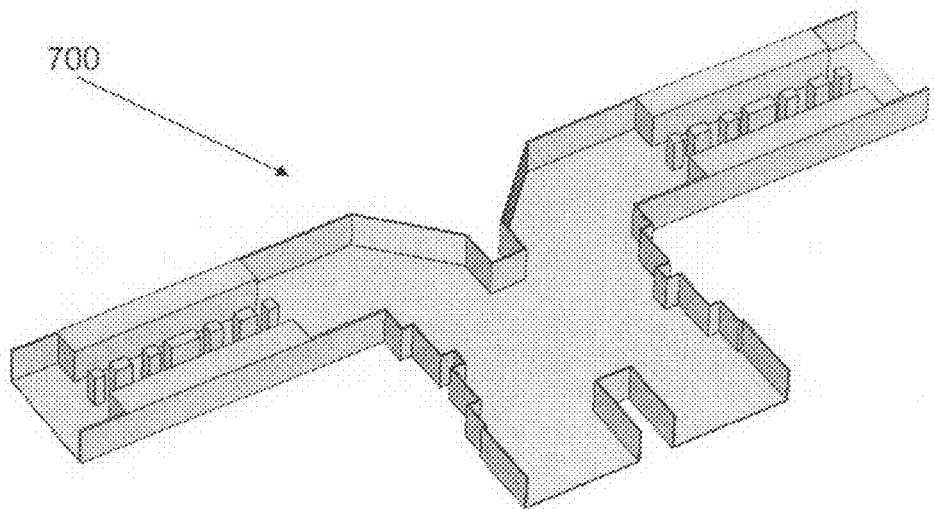
FIGS. 7A and 7B are simplified three-dimensional and top views respectively of an RF module, according to a fourth exemplary embodiment of the present invention.
Figure 7B:
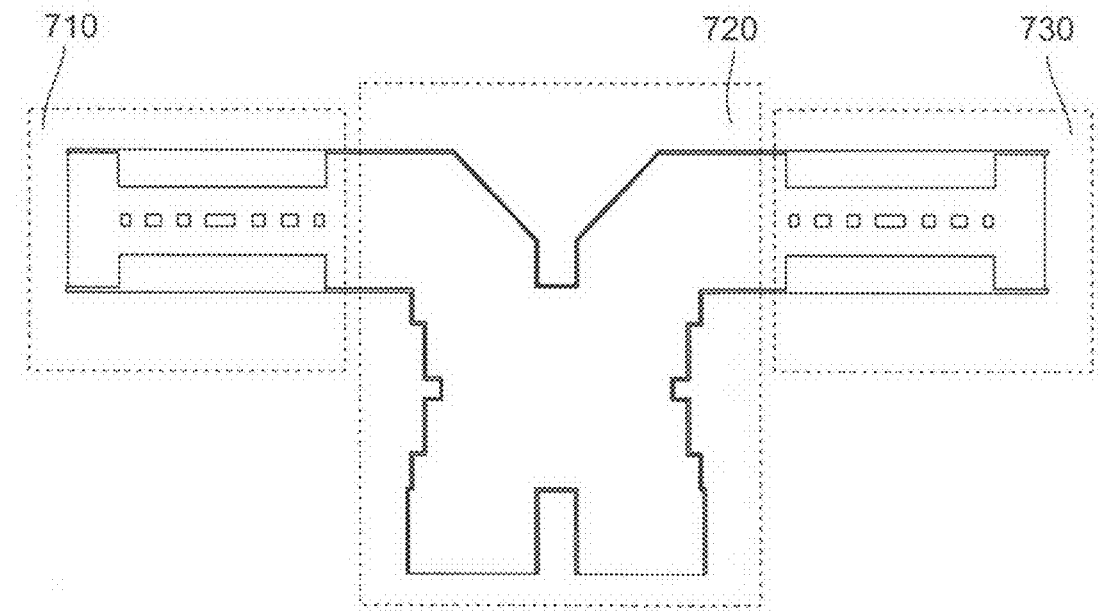

Reference is now made to FIGS. 7A and 7B, which are simplified three-dimensional and top views respectively of an RF module, according to a fourth exemplary embodiment of the present invention. RF module 700 includes two bandpass filters, 710 and 730, and hybrid coupler 720. Hybrid coupler 720 may be used to split/combine RF signals shifted in phase, for polarized transmission/reception of an RE signal. Filters 710 and 730 operate in parallel, filtering signals received from (or provided to) hybrid coupler 720.

In other embodiments, the RF module includes additional waveguide components. For example, the RF module may include multiple filters and/or couplers. When additional waveguide components are incorporated into the RF module, more complex processing of the RF signal may be implemented.

An exemplary embodiment of the RF module of the present invention comprises a car transceiver operating in the millimeter wave frequency range. An embodiment of a monolithic transceiver is manufactured by forming a conductively coated channel within a plastic block, resulting in a low-cost millimeter wave waveguide device. The conductively coated channel is shaped as adjoined and matched RF waveguide components configured as a transceiver.

The embodiments described above integrate multiple RF waveguide components into a single RF module. This approach may be used to obtain a diplexer for separating a received RF signal into separate frequency bands. An integrated antenna front end suitable for full duplex operation is also shown. The front end has low insertion loss and high isolation between transmit and receive. The front end may be formed passive components, which do not include tuning devices (e.g. screws) and/or printed circuit boards (i.e. soft substrate with electrical conductors).

It is expected that during the life of a patent maturing from this application many relevant RF components, waveguide manufacturing techniques and materials will be developed and the scope of the corresponding terms is intended to include all such new technologies a priori.

As used herein the term "about" refers to ±0.1 dB for insertion loss, and to ±6 dB for isolation.

The terms "comprises", "comprising", "includes", "including", "having" and their conjugates mean "including but not limited to".

As used herein, the singular form "a", "an" and "the" include plural references unless the context clearly dictates otherwise. For example, the term "a component" or "at least one component" may include a plurality of components.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find measured and calculated support in the following examples.

EXAMPLES

Reference is now made to the following examples, which together with the above descriptions illustrate some embodiments of the invention in a non limiting fashion.

Figure 8:
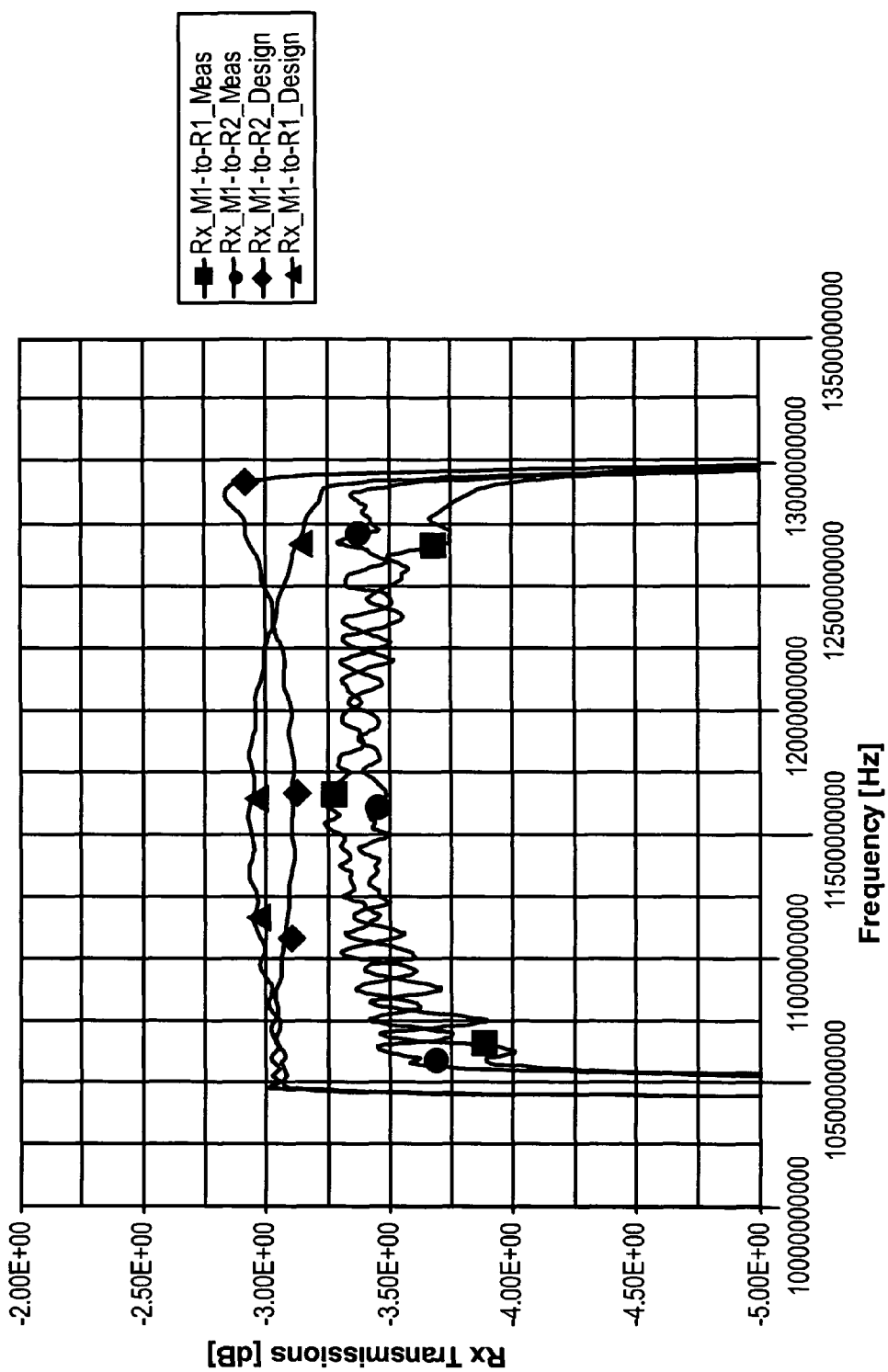
FIG. 8 shows the insertion loss (measured and simulated) obtained between the main RF port and each of the reception ports of an exemplary embodiment of a front end.
Figure 9:
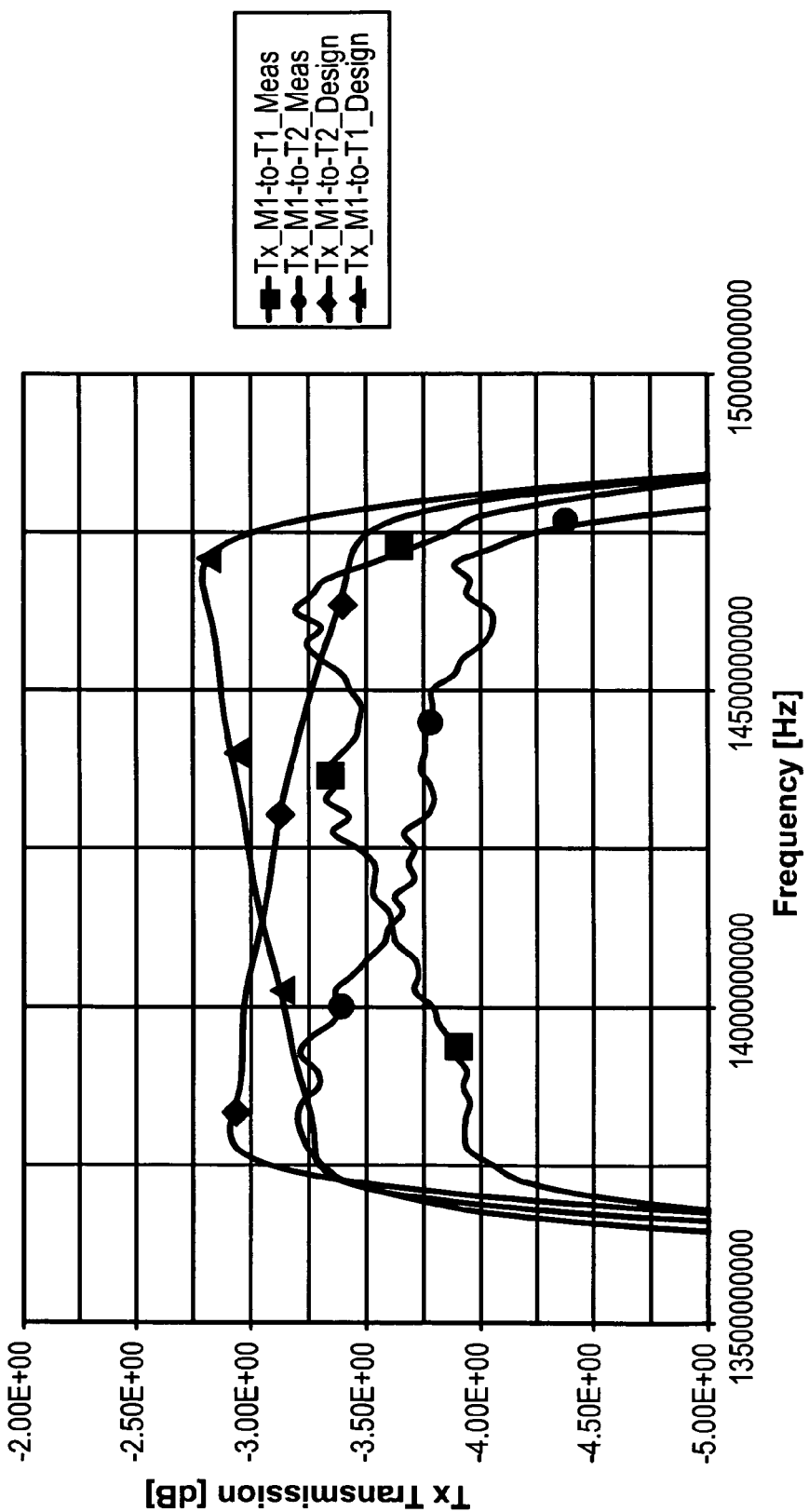
FIG. 9 shows the insertion loss (measured and simulated) obtained between the main RF port and each of the transmission ports of an exemplary embodiment of a front end.
Figure 10:
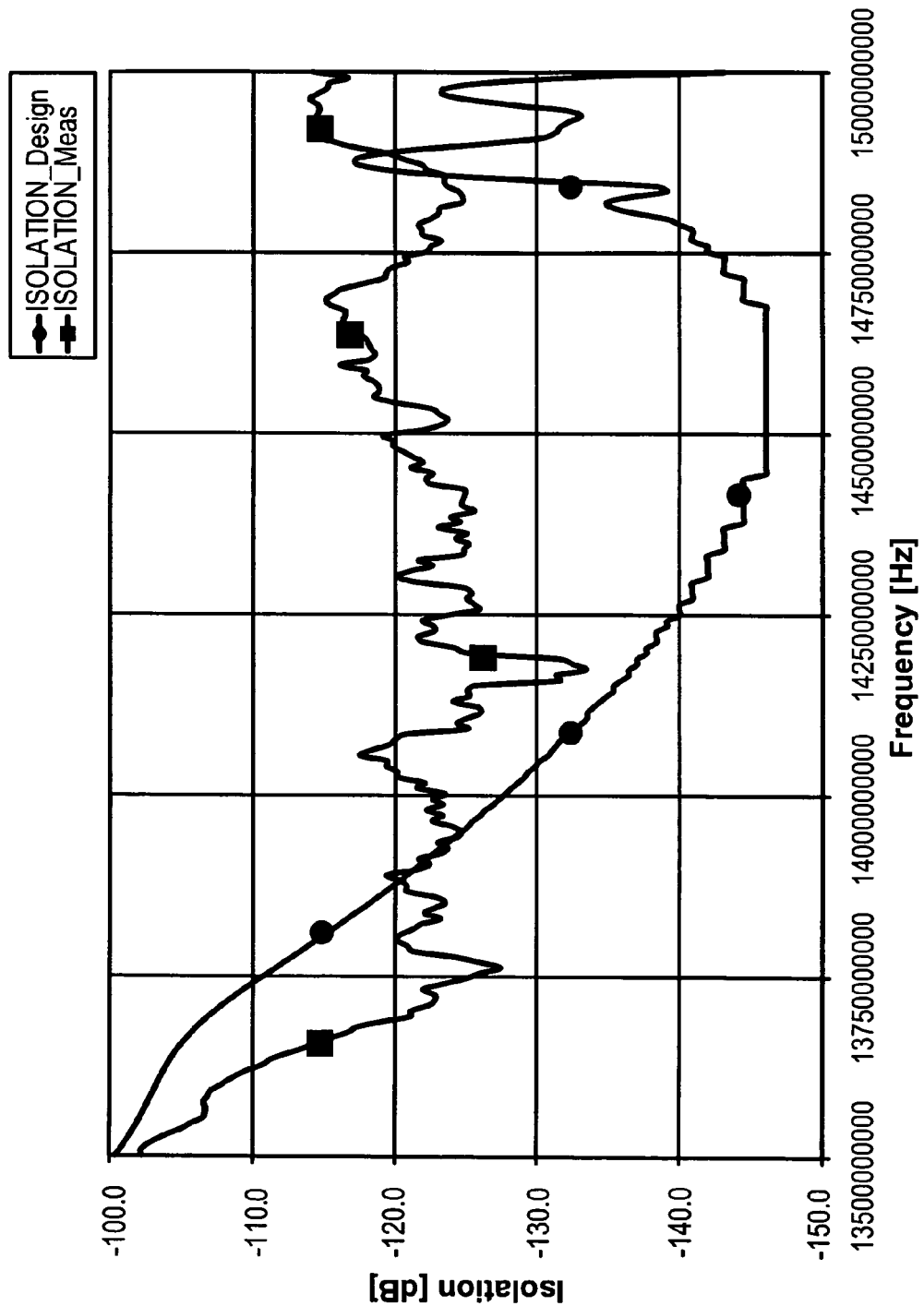
FIG. 10 shows the isolation (measured and simulated) obtained between a transmission port and a reception port of an exemplary embodiment of a front end.

FIGS. 8-10 show simulated and measured levels of insertion loss and isolation obtained for an embodiment of a front end designed as shown in FIG. 1. In the discussion of FIGS. 8-9, the 3 dB splitting ratio in the Rx and Tx hybrid couplers is not considered as loss.

The Ku-band front end has a receive bandwidth of 10.7-12.75 GHz and a transmit bandwidth of 14-14.5 GHz. Measured results were obtained for a prototype manufactured using CNC machining. The front end is a compact unit arranged in a flat planar design, which fits into an aluminum block of 27 cm×11 cm×1 cm. These dimensions, and specifically the 1 cm height, may not be achievable if standard waveguide flanges are incorporated in the assembly. Note that a typical waveguide flange (WR62) has a 3.2 cm×3.2 cm cross section, so that the total front end height would be tripled if a WR62 flanged waveguide component were included.

In the following:

1) The term "main RF port" indicates PORT 1 of FIG. 1 (shown as Rx_M1 in FIG. 8 and as Tx_M1 in FIG. 9). Note that equivalent results would be obtained for PORT 2 of FIG. 1 due to the symmetry of the simulated front end.

2) The term "reception port" indicates PORT 5 or PORT 6 of FIG. 1 (shown respectively as R1 and R2 in FIG. 8).

3) The term "transmission port" indicates PORT 3 or PORT 4 of FIG. 1 (shown respectively as T1 and T2 in FIG. 9).

FIG. 8 shows the insertion loss (measured and simulated) obtained between the main RF port and each of the reception ports. It is seen that an insertion loss of about 0.5 dB is obtained for both reception ports over the reception bandwidth of 10.7-12.75 GHz.

FIG. 9 shows the insertion loss (measured and simulated) obtained between the main RF port and each of the transmission ports. It is seen that an insertion loss of about 0.5 dB is obtained for both transmission ports over the transmission bandwidth of 14-14.5 GHz.

FIG. 10 shows the isolation (measured and simulated) obtained between a transmission port and a reception port. It is seen that an isolation of about −120 dB is obtained over the transmission bandwidth of 14-14.5 GHz.

In summary, losses of about 0.5 dB in the passband and an isolation of about 120 dB between receive and transmit ports are demonstrated for both the simulated and the measured prototype front end.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An antenna front end, defining with channels within a material block:
    a first diplexer, comprising a first coupler, a first transmit band filter and a first receive band filter, adjoined and matched to form a first continuous waveguide channel; and
    a second diplexer, comprising a second coupler, a second transmit band filter and a second receive band filter, adjoined and matched to form a second continuous waveguide channel.

2. An antenna front end according to claim 1, wherein each of said diplexers further comprises a respective RF port formed in said material block, and configured as an RF port to a respective T-Junction.

3. An antenna front end according to claim 2, wherein each of said T-Junction is configured to convey an RF signal from a respective transmit band filter for output by a respective RF port, and to convey an RF signal input from a respective RF port to a respective receive band filter.

4. An antenna front end according to claim 1, further comprising a receive hybrid coupler defined with a channel within said material block, and adjoined and matched to said first and second receive band filters.

5. An antenna front end according to claim 1, further comprising a transmit hybrid coupler defined with a channel within said material block, and adjoined and matched to said first and second transmit band filters.

6. An antenna front end according to claim 1, wherein at least one of said filters is non-tunable.

7. An antenna front end according to claim 1, wherein both of said diplexers are for passive processing of an RF signal.

8. An antenna front end according to claim 1, further comprising a lid adapted to adjoin to said material block so as to form a waveguide cavity.

9. An antenna front end according to claim 1, further comprising at least one waveguide to coax adapter.

10. An antenna front end according to claim 1, wherein said front end is configured for operation over at least 20% of a frequency band of 10.7 GHz to 14.5 GHz.

11. An antenna front end according to claim 1, wherein said front end is configured for reception over at least a portion of a frequency band of 10.7 GHz to 12.75 GHZ, and is configured for transmission over at least a portion of a frequency band of 14.0 GHz to 14.5 GHZ.

12. An antenna front end according to claim 1, wherein at least one of said filters comprises a channel with two bends, so as to reduce a required dimension of said material block.

13. An antenna front end according to claim 1, wherein said waveguide channels are coated with an electrically conductive material.

14. An antenna front end according to claim 1, wherein at least a portion of said waveguide channels is filled with a dielectric material.

15. An antenna front end according to claim 1, wherein all of said waveguide channels are filled with a dielectric material.

16. An antenna front end according to claim 1, formed of pressure-molded dielectric material coated with an electrically conductive material.

17. An antenna front end according to claim 1, formed of machined dielectric material coated with an electrically conductive material.

* * * * *